No. 661,352. Patented Nov. 6, 1900.
J. R. MOODY.
FITTING.
(Application filed Dec. 19, 1899.)
(No Model.)
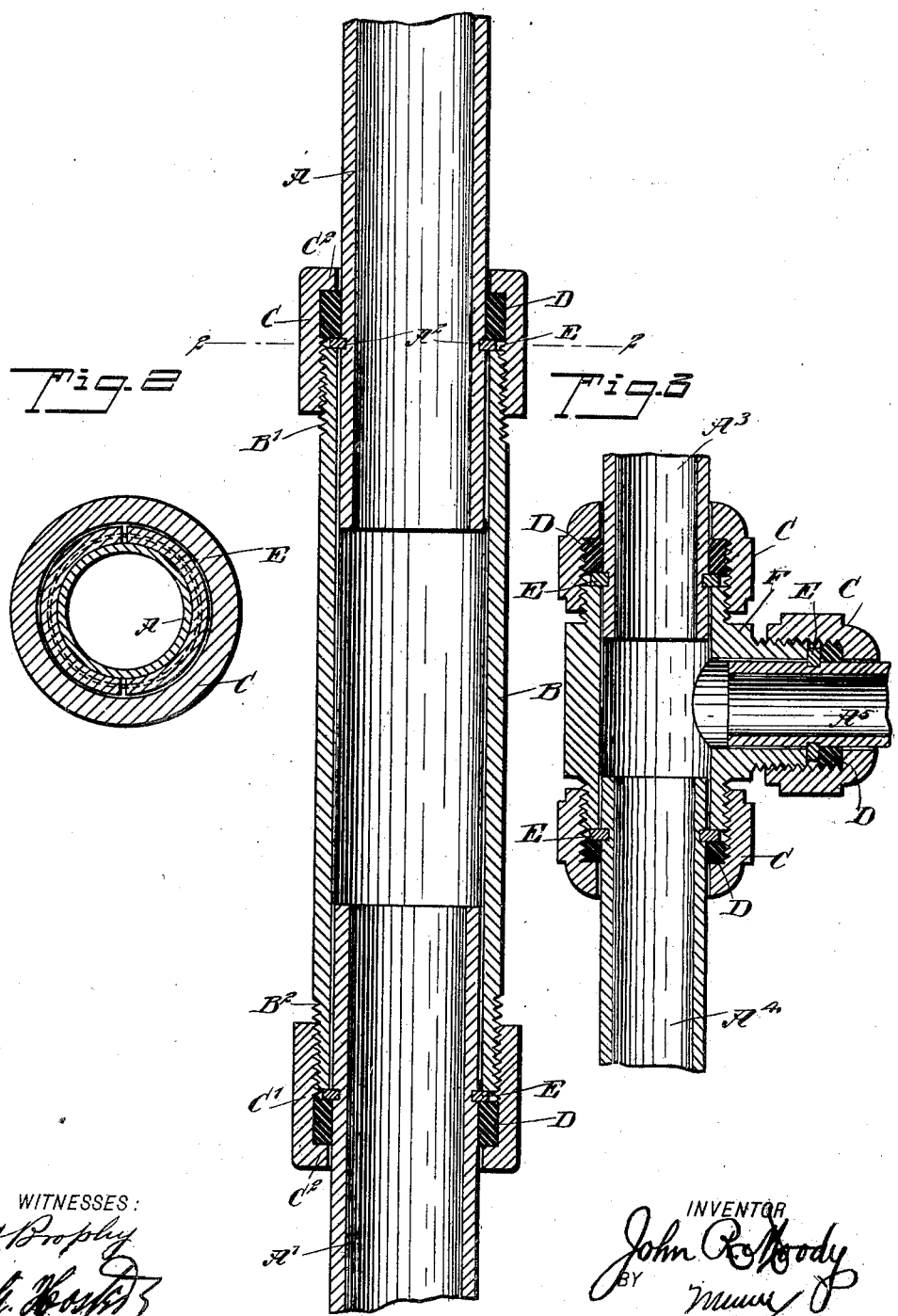

UNITED STATES PATENT OFFICE.

JOHN REDFERN MOODY, OF PERRY, IOWA.

FITTING.

SPECIFICATION forming part of Letters Patent No. 661,352, dated November 6, 1900.

Application filed December 19, 1899. Serial No. 740,855. (No model.)

*To all whom it may concern:*

Be it known that I, JOHN REDFERN MOODY, a citizen of the United States, and a resident of Perry, in the county of Dallas and State of Iowa, have invented a new and Improved Fitting, of which the following is a full, clear, and exact description.

The object of the invention is to provide a new and improved fitting more especially designed for effectively repairing broken water, steam, or other pipes, for connecting pipes with each other, and for connecting pipes with elbows, reducers, T's, valves, and other devices without requiring threading of the pipe or the device with which the pipe is to be connected.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a sectional plan view of the improvement applied to a broken pipe. Fig. 2 is a sectional end view of the same on the line 2 2 in Fig. 1, and Fig. 3 is a sectional side elevation of the improvement as arranged on a T.

The arrangement shown in Figs. 1 and 2 represents the device applied to the adjacent pipe ends A A' to be connected with each other, and the said ends A A' are for this purpose engaged externally by the ends of a fitting in the shape of a tube B, formed with external threads B' B², on which screw the internal threads of couplings C C', respectively, each formed at its outer end with an inwardly-extending annular flange C³, surrounding the respective end A or A'. The internal thread of each coupling C preferably extends about half the length of the coupling, as is plainly indicated in Fig. 1, but may extend half or full length of the coupling, and in the outer portion of the coupling is placed a packing D, adapted to rest on or abut at its inner edge against a sectional collar E, fitted into an annular groove A², formed externally on the corresponding end A or A'.

As shown in Fig. 1, the collars E are located directly at the ends of the tube B, so that the latter is prevented from moving longitudinally on the pipe ends A A', and when the several parts are in position and the couplings C C' are screwed up then the packings D securely pack the couplings, pipe ends, tube, and collars to prevent leakage at either of the broken ends of the pipe, and at the same time a free communication is established between the ends A A' by way of the tube B. If desired, the sectional collars E may be omitted, so that the packings D abut directly against the ends of the tube B, and when the couplings are screwed up a tight joint is had between the pipe ends, the coupling, and the tube B. It is understood that the tube B has an inner diameter slightly in excess of the external diameter of the ends A A' of the broken pipe, so as to permit of conveniently sliding the ends of the tube B over the said ends A A'. The collars E are made in sections, so as to be readily fitted into the annular grooves A², the collars being of sufficient depth to extend with half their distance into the annular groove, the remaining half being beyond the peripheral surface of the corresponding ends A A'.

The object of the groove and the sectional collars is to insure a tight joint, as above explained, and to hold the tube and pipe ends in proper position relatively to each other, so that pressure or motion of the pipe will not pull it out of the tube B.

In the construction shown in Fig. 3 a series of pipes A³ A⁴ A⁵ are connected with the fitting F in the form of a T in the same manner as the end of the pipe A or A' with the tube B—namely, by couplings C, screwing on the ends of the T F, and packings D pressed against the pipes, and stop-collars E abutting on the T ends to limit the inward movement of the pipe ends into the T and to insure a tight joint, as above explained.

Having thus fully described my invention, I claim as new and desire to secure by Letters Patent—

1. A device of the class described, comprising a pipe-fitting with external threads and adapted to receive the end of a pipe, a collar fitted on the pipe end, and removably secured thereto but held against longitudinal movement thereon, the said collar abutting on the end of the fitting, a coupling slipped over the pipe and screwing on the threads of the fitting, and a packing in the coupling and adapted to be compressed against the collar, substantially as described.

2. A device of the class described, comprising a pipe-fitting with external threads, and adapted to receive the end of the pipe, the said pipe being formed near its end with an external annular groove, a sectional collar engaging the annular groove in the pipe end, and abutting on the end of the fitting, a coupling slipped over the pipe and screwing on the threads of the fitting, and a packing resting against the collar and adapted to be compressed by the said coupling, substantially as described.

3. A device of the class described, comprising a fitting having externally-threaded ends and adapted to slip over the ends of pipes, sectional collars held on the pipe ends, couplings screwing on the threaded fitting ends and extending over the pipe, and having inward flanges on the outer ends of the couplings, and packings in the couplings between the coupling-flanges and said collars, the latter being set in external annular grooves formed in the pipe ends, as set forth.

In testimony whereof I have signed my name to this specification in the presence of two subscribing witnesses.

JOHN REDFERN MOODY.

Witnesses:
J. M. TYES,
L. M. RESSER.